Aug. 17, 1948.   W. H. KLIEVER   2,447,344
PHOTOELECTRIC SYSTEM FOR REMOTE
INDICATION OF ANGULAR POSITIONS
Filed May 31, 1943   3 Sheets-Sheet 2
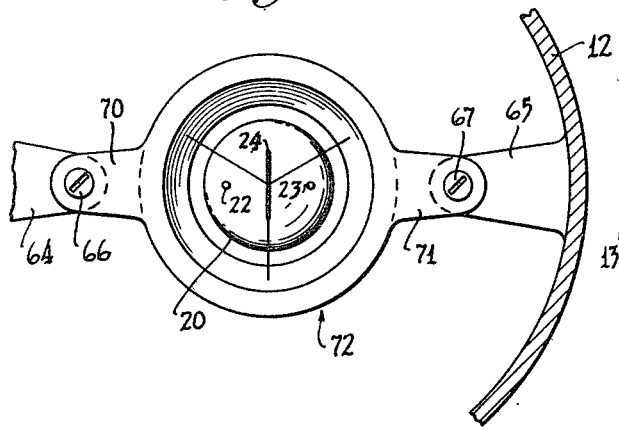
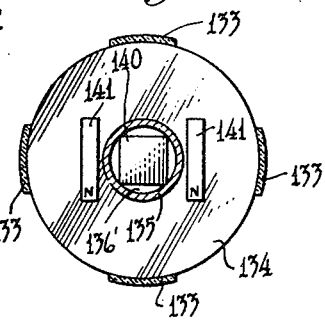
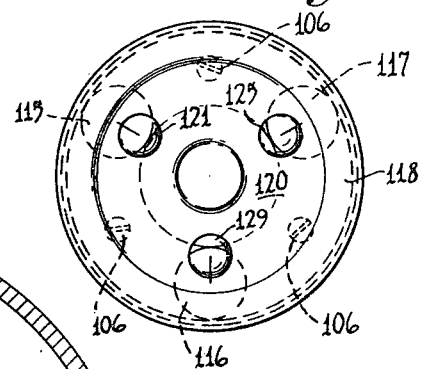
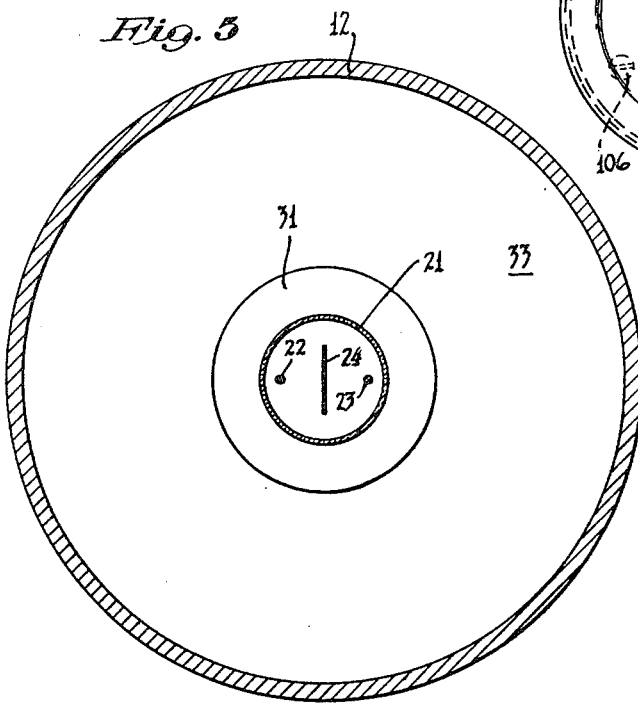
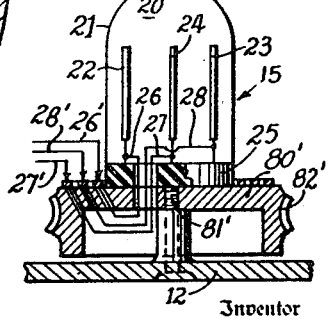
Inventor
WALDO H. KLIEVER
By George H. Fisher
Attorney Aug. 17, 1948.       W. H. KLIEVER        2,447,344
          PHOTOELECTRIC SYSTEM FOR REMOTE
              INDICATION OF ANGULAR POSITIONS
Filed May 31, 1943                3 Sheets-Sheet 3
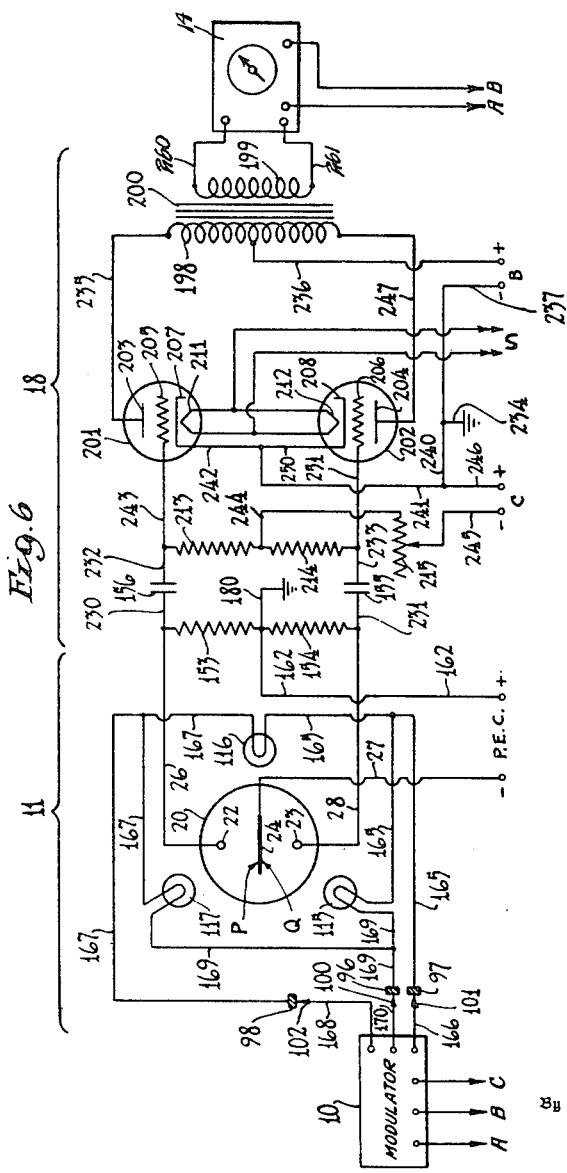
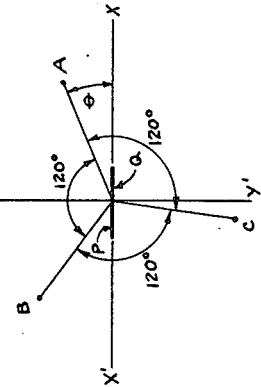
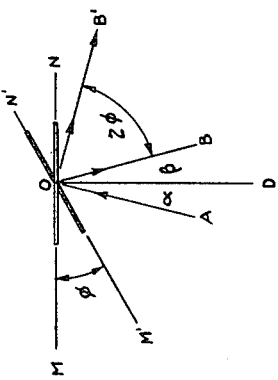
Inventor
WALDO H. KLIEVER
George H. Fisher
Attorney Patented Aug. 17, 1948

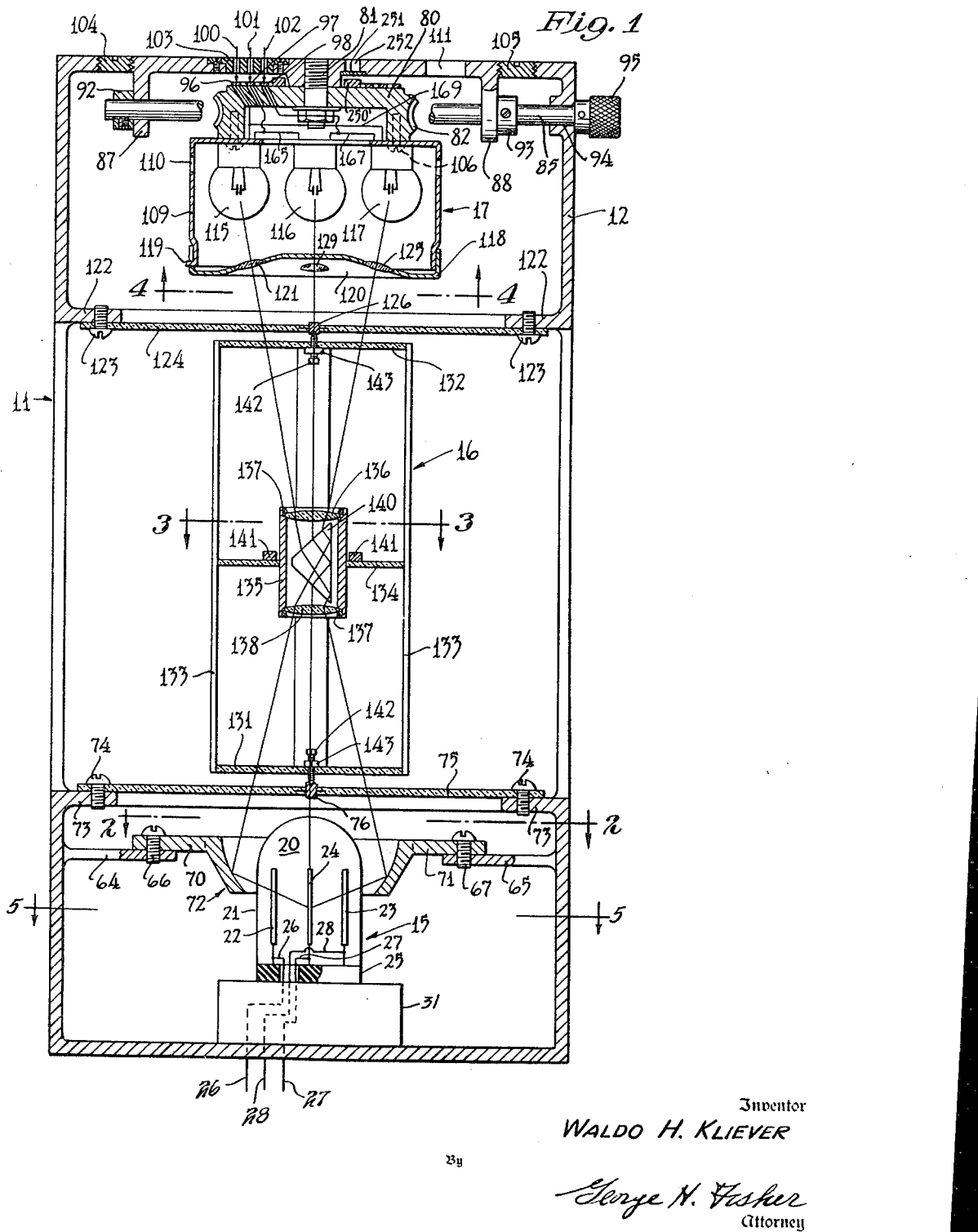

2,447,344

UNITED STATES PATENT OFFICE 2,447,344

PHOTOELECTRIC SYSTEM FOR REMOTE INDICATION OF ANGULAR POSITION

Waldo H. Kliever, Minneapolis, Minn., assignor to Minneapolis-Honeywell Regulator Company, Minneapolis, Minn., a corporation of Delaware Application May 31, 1943, Serial No. 489,174

16 Claims. (Cl. 177—351)

This invention relates to control apparatus and more particularly to devices in which motion of a continuously rotatable member is made effective at a distance to actuate an indicator. Since the invention is particularly adapted for use as a remotely indicating means for a magnetic compass, my preferred embodiment of the invention discloses it in association with such a compass, but the invention is obviously adapted to be associated with any rotatable member which it may be desired to use as a controller.

Devices for broadly making effective at a distance changes in the position for example of a compass needle are known, but these devices are subject to various difficulties and disabilities. One such disability in particular is in the fact that no satisfactory means have heretofore been discovered in which the mechanism is continuously responsive to the movement of the rotatable member in either direction, over its entire range of operation. It is an object of this invention to overcome this disability in a novel fashion.

An object of this invention is to provide a new and improved remotely indicating apparatus.

A further object of this invention is to provide an improved remotely indicating compass.

Another object of this invention is to provide an improved optico-electrical system for continuously transmitting the angular position of a continuously rotatable member.

Still another object of this invention is to provide a remotely indicating compass which is continuously responsive to angular motion of the controlling compass member.

Still another object of my invention is to provide a device for torque amplification whereby a minute signal torque produces an enormously larger response torque.

Yet another object of this invention is to provide a photoelectric cell having a plurality of photoemissive members and a control system including such a cell and adapted to respond differentially to differential illumination of its photoemissive members.

A still further object of this invention is to provide optical means for causing phase variations in an electrical system, the variations being correlated with the angular movement of a continuously rotatable member.

A still further object of this invention is to provide an electrically light responsive means for generating an alternating potential of variable phase.

Various other objects, advantages and features of novelty which characterize my invention are pointed out with particularity in the claims annexed to and forming a part of this invention. However for a better understanding of the invention, its advantages and objects attained with its use, reference should be had to the subjoined drawing which forms a further part of this specification and to the accompanying descriptive matter in which I have illustrated and described certain preferred embodiments of the invention.

In the drawing:

Figure 1 is a diagrammatic view of a device embodying certain features of my invention, shown in generally longitudinal section, parts being broken away for the sake of clarity, Figure 2 is a transverse section of the same device, the section being taken in a plane indicated by the line 2—2 in Figure 1, looking in the direction shown by the arrows, Figure 3 is a similar section indicated by the line 3—3 of Figure 1, Figure 4 is a similar section indicated by the line 4—4 of Figure 1, Figure 5 is a similar section indicated by the line 5—5 of Figure 1, Figure 6 is a diagrammatic showing of a control system embodying my invention, Figures 7 and 8 are diagrams representative of mathematical considerations involved in the practice of my invention, and Figure 9 is a fragmentary view of a modification of the invention.

I have diagrammatically presented in the drawings one embodiment of the device, but it will be readily understood that the drawing is presented by way of illustration only and that numerous changes are possible in keeping with the spirit of my invention.

Construction

Referring first to Figure 6 it will be seen that a control apparatus embodying my invention comprises a modulator 10, a photoelectric pick-up device 11, an integrating circuit 13, and an indicator 14. Before setting forth any details of the operation for my system, I shall give a detailed description of its structural elements.

Figure 1 primarily gives structural details of a photoelectric pick-up device 11 embodying a principal portion of my invention. The device comprises a housing 12, which is shown as circular in section but which may have any other convenient section. The housing is maintained with its longitudinal axis vertical by any conventional means such as mounting in gimbals or being associated with a gyroscope. One end of housing 12 supports a light source structure referred to generally by numeral 17. The other end or base 33 of the housing supports a photocell structure referred to generally by the numeral 15. In the central portion of the housing is mounted the compass member 16.

Photocell structure 15 includes a phototube 20 comprising the usual transparent envelope 21 which may be evacuated and which encloses a pair of anodes 22 and 23 and a cathode 24. Anodes 22 and 23 are diametrically opposite, and are equally spaced from the cathode 24. Cathode 24 is plane in configuration and its transverse dimension is large compared with the diameters of the anodes. The cathode is provided with photo-emissive surfaces on both sides and is bilaterally symmetrical about the axis of the cell. The phototube is provided with the usual electrically insulating base 25 traversed by the conductors 26, 27, and 28 leading from electrodes 22, 24, and 23 respectively.

Phototube 20 is mounted by any convenient means on a disk 31, so that the axis of the tube coincides with the longitudinal axis of the housing.

Axially spaced from end 33 of housing 12 are a pair of lugs 64 and 65 inwardly projecting and diametrically opposite, and having holes tapped to engage machine screws 66 and 67. These screws pass through apertures in wings 70 and 71 of a mirror member, generally indicated by numeral 72, which may be of silvered glass, polished metal, or other suitable material. The mirror member is internally reflecting, and the reflecting surface may be conical. However, I prefer to make the configuration of this surface a zone of a sphere whose center is taken at a particular place referred to below.

Axially spaced from lugs 64 and 65 is an inwardly projecting flange 73 having holes tapped to engage machine screws 74. Screws 74 pass through a disk 75 of glass or transparent plastic having plane parallel surfaces. I prefer to use molded plastic and I have illustrated a pivot socket member 76 as being molded into the center of disk 75. Socket member 76 is provided with a conical recess for receiving a pivot point.

Referring now to light source structure 17 mounted in the top end of housing 12, as shown in Figure 1, I provide a worm wheel 80, mounted on a stud 81, and provided with teeth 82. A worm, not shown, is provided to cooperate with this worm wheel and is mounted on a shaft 85 for rotation therewith. Shaft 85 passes through openings in lugs 87 and 88 projecting from the top of the housing and is provided with collars 92 and 93 to prevent end play: it projects through an opening 94 in housing 12, and may carry on its outer end a knob 95. Collector rings 96, 97, and 98 are carried by disk 80 for cooperation with brushes 100, 101, and 102, respectively, carried in insulating plug 103. Screw plugs 104 and 105 are provided for giving access to collars 92 and 93.

Supported upon worm wheel 80 for rotation therewith, and fixed thereto as by screws 106 is a lens mount 109. This lens mount is provided with a number of radial apertures 110 and the top end of housing 12 is provided with apertures 111, the apertures providing ventilation for the lamp chamber contained within the lens mount. Lamps 115, 116, and 117 are supported within lens mount 109 for rotation therewith and are angularly spaced about the axis of the housing 120° apart. These lamps may be of gas filled type or any other type in which the intensity of the illumination may be varied substantially sinusoidally, within limits, as by variation in impressed voltage. Conductors 165, 167, and 169 from the lamps pass through disk 80 and are connected to collector rings 97, 98, and 96 as more fully described below.

The bottom of lens mount 109 comprises a cup 118 frictionally engaging therewith in predetermined rotated relation, as at 119 in Figure 1, and is upwardly dished to provide a conical portion 120. Mounted in apertures in conical portion 120 are lenses 121, 125, and 129, adapted to cooperate respectively with lamps 115, 117, and 116.

Axially spaced from the top of the housing is a second inwardly projecting flange 122 supporting by means of machine screws 123 a disk 124 in all respects similar to disk 75 and bearing a similar socket member 126.

Compass member 16 is in the form of a cage comprising lower and upper disk members 131 and 132 connected by axially extending members 133. Members 131 and 132 are transparent with plane parallel surfaces. Intermediate the upper and lower disk members is a central disk member 134 in which is mounted a cylindrical prism holder 135. The ends of this holder are shaped to receive upper and lower lenses 136 and 138 respectively, held in place by snap rings 137. Unitarily mounted within the prism holder is a prism 140 of an optical nature similar to the familiar erecting right angle prism used in optical instruments. Unitarily secured to disk 134 are a pair of magnetic needles 141 arranged with their north poles pointed in the same direction. Upper and lower disk members 131 and 132 are provided with pivot screws 142 threadedly engaged in the disks and locked in adjusted positions by lock nuts 143. Member 16 as a whole is pivotally mounted for rotation in the central portion of housing 12 by the cooperation of pivot screws 142 with socket members 77 and 126, so that compass member 16 rotates about an axis which coincides with the axis of the housing. With this axis the optical axis of lenses 136 and 138 also coincide.

The angle of the dished portion 120 of lens mount cap 118 is such that the axes of beams of light emerging from lenses 121, 125, and 129 are directed through lens 136 so as to impinge on the upper sloping surface of prism 140. Each of these beams is of restricted size, and is directed at an angle with respect to the optical axis of the lens and prism assembly. As shown in Figure 1, the beam for each lamp passes through the transparent end 132 of the compass cage at a point spaced from the center, so that the opaque bearing and pivot members are not in the field of the beams at any time.

Similarly, the beams of light emerging from lens 136 are relatively diverging, so that they pass through the transparent end 131 of the compass cage at points spaced from the opaque bearing and pivot member. Due to the fact that members 131 and 132 are parallel and have plane parallel surfaces, rotation of the compass member has no effect on the path of the light therethrough.

Mirror member 72 is so designed that light emerging from lens 138 and striking it anywhere in its circumference is reflected toward the axis in the region of the cathode 24 of phototube 20. The center and the radius of the sphere whose zone is comprised in the reflecting surface of the mirror are chosen to cooperate with lenses 121 (or 125 or 129), 136, and 138 to give the desired effect.

Referring now to Figure 6, it will be seen that electrical energy is provided to lamps 115, 116, and 117 from modulator 10, which may comprise any conventional device adapted to impress small alternating potentials upon the lamp in a desired fashion, and may in its simplest form comprise merely a step-down three-phase transformer working from a three-phase line. It is well known that the maximum values of potential appear in the respective phases of a three-phase circuit spaced by phase angles of 120 degrees. Accordingly, the several lamps will reach their respective maximum and minimum values of illumination at instants respectively spaced by intervals equal to one-third of the period of the modulation frequency.

This phase displacement of the illumination in the several lamps constitutes an important part of my invention, and any other familiar means of obtaining this result may obviously be substituted for the transformer referred to, without departing from my invention.

The modulator is provided with upper, middle, and lower terminals, between each two of which an alternating potential of the desired magnitude is maintained. Circuits to the lamps may be traced as follows: from the upper terminal of the modulator by conductor 168, brush 102, ring 98, conductor 167, lamp 117, conductor 169, ring 96, brush 100, and conductor 170, to the middle terminal of the modulator; from the upper terminal of the modulator by conductor 168, brush 102, ring 98, conductor 167, lamp 116, conductor 165, ring 97, brush 101, and conductor 166, to the bottom terminal of the modulator; and from the middle terminal of the modulator by conductor 170, brush 100, ring 96, conductor 169, lamp 115, conductor 165, ring 97, brush 101, and conductor 166 to the lower terminal of the modulator. Thus, each lamp receives at all times alternating electrical energy having a fixed phase relation to the energy provided to the other lamps at the same instant.

The lamps are individually provided with direct current for maintaining a constant minimum intensity. This connection is not shown in the figures to avoid complicating the drawing to the extent of obscuring the invention.

Electrical energy is provided to the phototube through a pair of resistors 153 and 154, the upper end of resistor 154 being connected with the lower end of resistor 153.

A first electric circuit may be traced from the phototube as follows: anode 22, conductor 26, resistor 153, conductor 162, the positive pole of a source of electric energy (which may be a battery), the battery, and conductor 27 to the cathode 24.

A second electric circuit may be traced from the phototube as follows: anode 23, conductor 28, resistor 154, conductor 162, the positive pole of the battery, the battery, and conductor 27 to the cathode 24.

It is thus apparent that the phototube comprises in effect a pair of photoelectric cells having their cathodes electrically connected, and so arranged that light affecting one cannot affect the other.

What I have chosen to call my integrating circuit is coupled by a pair of capacitors 155 and 156 with the photoelectric pick-up device 11. The integrating circuit includes a pair of resistors 213 and 214, a bias adjusting resistor 215, a pair of triodes 201 and 202, and an output transformer 200. Resistors 213 and 214 are connected together at one end, as shown. Triode 201 comprises plate 203, grid 205, cathode 207, and filament 211. Triode 202 comprises plate 204, grid 206, cathode 208, and filament 212. The free end of resistor 213 is connected to conductor 26 leading from the phototube, as by conductor 232, capacitor 156 and conductor 230, and to the grid 205 of triode 201 by conductor 243. The free end of resistor 214 is connected to conductor 28 leading from the phototube as by conductor 233, capacitor 155, and conductor 231, and to the grid 206 of the triode 202 by conductor 251. Transformer 200 comprises a center tapped primary 198 and a secondary 199, the latter being connected to the input of motor control device 13, which may be of any suitable type as more fully set forth below.

The plate circuit of triode 201 may be traced as follows: plate 203, conductor 235, the upper half of primary 198, conductor 236, the plate power supply, conductors 237, 240, 241, and 242, cathode 207, and back to the plate.

The grid circuit of triode 201 may be traced as follows: grid 205, conductor 243, resistor 213, conductor 244, resistor 215, conductor 245, the grid voltage supply, conductors 246, 241, and 242, cathode 207, and back to the grid.

The plate circuit of triode 202 may be traced as follows: plate 204, conductor 247, the lower half of primary 198, conductor 236, the plate power supply, conductors 237, 240, 241, and 250, cathode 208 and back to the plate.

The grid circuit of triode 202 may be traced as follows: grid 206, conductor 251, resistor 214, conductor 244, resistor 215, conductor 245, the grid voltage supply, conductors 246, 241, and 250, cathode 208, and back to the grid.

Indicator 14 may be of any suitable type, as I have previously indicated. For purposes of illustration I have shown it as comprising a conventional synchroscope capable of rotation through 360°, having a standard frequency provided as by conductors A and B, electrically identical with conductors A and B supplying the modulation, and connected with the secondary 199 of transformer 200 as by conductors 260 and 261 to provide the comparison frequency.

For purposes later to be set forth, worm wheel 80 is provided, as best shown in Figure 1, with a graduated ring 250' adapted to cooperate with an index 251 mounted at the bottom of an aperture 252 in the top of housing 12. Thus, upon rotation of knob 95 the angular relation of the worm wheel and associated lamp structure with respect to the housing may be determined.

Operation

The functioning of my system and the operation of its various components will now be set forth.

Let a plane be passed parallel to the axis of the housing and perpendicular to the prism at the point of reflection of for example the center ray of the beam of light from lamp 115. This plane is indicated by OD in Figure 7, which is a projection, on a plane perpendicular to the axis of the housing and to the internally reflecting face MN of the prism at the point of reflection, of the traces of incident and reflection rays AO and OB. Since the angle of incidence $\alpha$ is equal to the angle of reflection $\beta$, the angle AOB is numerically equal to $2\alpha$. As $\alpha$ changes, $2\alpha$ also changes, and as angle $\alpha$ increases, angle $\beta$ increases in the opposite direction.

Now, holding AO fixed, let the reflection surface of the prism be rotated through an angle $\phi$ to a new position M'N'. The angle of incidence is now $(\alpha+\phi)$ and therefore the angle AOB' is $2(\alpha+\phi)$. As angle $\phi$ changes, angle $2(\alpha+\phi)$ also changes, and as angle $\phi$ increases, angle $2(\alpha+\phi)$ increases in the same direction.

In terms of my device, the above general statements may be interpreted as follows: Angular displacement of the lamps from initial positions in one direction, with respect to the phototube, causes equal angular displacement of the apparent sources of light from their initial positions in the opposite direction. Rotation of the prism, however, causes angular displacement of the apparent sources of light from their initial positions in the same direction and of twice the magnitude.

Referring now to Figure 8, I have presented a normal projection of a plane of limited extent and three converging central rays A, B, and C from sources spaced 120° apart, the ray A having an angle $\theta$ with the line of the plane. The total light flux I on the surface P of the plane as $\theta$ varies is not rigidly a sine function of the angle $\theta$, due to the fact that the light from the sources is not parallel but divergent. Nevertheless, if the distance of the sources is large compared with the extent of the plane, and if $\theta$ varies through small values, no material error is introduced by going on the assumption that $$i_a = 1_a \sin \theta$$

where $i_a$ is the total instantaneous light flux falling on the plane due to ray A and $1_a$ is the instantaneous intensity of the source of ray A. Strictly speaking, this equation should be written as a proportion, since not all of the light leaving the source impinges upon the plane at its maximum value, and since the distance between the source and the plane should also be considered in accurate work. These factors, however, remain constant under the conditions in which my invention is to be used, and I therefore have simplified the equation by this omission. Similarly, $i_b = 1_b \sin (\theta+120)$ and $$i_c = 1_c \sin (\theta+240) = -1_c \sin (\theta+60)$$

If the rotation of the rays takes place in the opposite direction, $\theta$ has the value $(-\theta)$ and the validity of the equation is unchanged.

The instantaneous intensity of light 1 at a source is related to the maximum intensity L by the equation $$1 = K + L \sin \omega t$$

where $\omega$ is defined in terms of the frequency $f$ of the modulating potential by the expression $$\omega = 2\pi f$$

and where K is a constant representing the intensity due to the D. C. component of the modulating current. Since only the A. C. component of the modulating current is amplified for use as a signal, K can be disregarded and the effective instantaneous values $1_a$, $1_b$, and $1_c$ of intensity of illumination at the sources of rays A, B, and C respectively may be defined as follows:

$$1_a = L \sin \omega t$$
$$1_b = L \sin (\omega t + 120°)$$
$$1_c = L \sin (\omega t + 240°) = -L \sin (\omega t + 60°)$$

(The negative sign is not to be interpreted as negative illumination, but as an intensity of illumination below the mean intensity due to A. C. and D. C. components in the lamp energizing potential.)

My apparatus is so constructed that the voltage modulating the source of ray A is of the same phase as that impressed by condensers A and B upon the fixed phase winding of synchroscope 14.

Substituting these values for $1_a$, $1_b$, and $1_c$ in the equations for $i_a$, $i_b$, and $i_c$ previously given, we have $$i_a = L \sin \omega t \sin \theta$$
$$i_b = L \sin (\omega t + 120) \sin (\theta + 120)$$
$$i_c = L \sin (\omega t + 60) \sin (\theta + 60)$$

The resultant illumination I on the cathode (that on the lower surface being considered negative) is given by the equation $$I = i_a + i_b - i_c$$

that is,
$$I = L \sin \omega t \sin \theta + L \sin (\omega t + 120) \sin (\theta + 120) - L \sin (\omega t + 60) \sin (\theta + 60)$$

which when simplified becomes $$I = 1.5 L \cos (\theta - \omega t)$$

The total illumination on both surfaces of the cathode (that on the lower surface being considered negative) is a cosine function, of constant amplitude, of the angle through which relative rotation between the cathode and the light sources has proceeded.

Referring to Figure 6, an increase in the illumination on surface P increases the photoemissive flowing through resistor 153 and therefore increases the IR drop between conductor 230 and ground. This voltage is being modulated at a frequency of say 60 cycles per second, and the modulated voltage is transmitted through capacitor 156 and is impressed upon grid 205 of triode 201. The negative bias on grid 205 is adjusted by resistor 215 so that a desired maximum plate current flows through the triode during the positive half cycle of a grid potential of maximum peak voltage. This adjustment brings about the same conditions in triode 202. Then from a given middle value of illumination of surface P, an increase in the illumination causes an increase in plate current during the positive half cycle of the grid; and this in turn causes an increase in the plate current flowing upward in primary 198. In the same way it will be seen that an increase in the illumination of surface Q causes an increase in the plate current flowing downward in primary 198. Since an increase in current flowing downward in primary 198 has an effect on the secondary 199 which is the opposite of an increase in current flowing upward in primary 198, it will be seen that the requirement given above, that the illumination on the lower surface be considered negative, has been complied with.

In use, my device is set up with its axis vertical, with the graduation marked "north" on ring 250' under index 251, in a craft having its axis in a magnetic north and south direction, power being provided for the modulator, the phototube, the integrator circuit, the amplifier, and the indicator. The device is rotated bodily until no response is perceived from the indicator, and then fastened immovably with respect to the axis of the plane. Under these conditions the phototube has such an angle with the rays from the light sources that the phase angle of the potential across secondary 199 with reference to the potential across conductors A and B is zero. In this condition, the synchroscope is in its zero position. If now the craft proceeds to fly a course bearing magnetically north, the position of the synchroscope remains unchanged.

However, should the axis of the craft deviate from a magnetic north by an angle $\phi$, compass member 16 swings due to the action of needles 141, through an angle $\phi$. The apparent positions of the light sources are rotated in the same direction, with respect to the phototube, through an angle $2\phi$. The output of transformer 200 is accordingly displaced with relation to the potentials across A, B by a phase angle $2\phi$.

The phase displacement between the output $e_t$ of transformer 200 and the voltage $e_s$ between conductors A and B is expressed in the equations given above. There $e_s = E \sin \omega t$ and $e_s$ has its peak value when $\omega t$ equals 90° plus any multiple of $2\pi$. On the other hand, $e_t \sim 1.5\,L\,\cos(\theta - \omega t)$ and $e_t$ has its peak value when $\omega t$ equals $\theta$ plus and multiple of $2\pi$.

A phase displacement therefore exists between $e_s$ and $e_t$ which is measured by the angle $90° - \theta$, and in the present example $\theta = 2\phi$. There is, of course, a concurrent change in the peak value of the output voltage of transformer 200, but this is not of sufficient magnitude to affect the action of synchroscope 14, which attempts to indicate the angle $(90° - 2\phi)$.

Should it be desired to maintain the craft in a course other than magnetic north, knob 95 may be rotated manually until graduated ring 250 takes the desired position under index 251. Positioning of the craft in the desired course then has the effect explained above in regard to a due north course of the plane with zero course adjustment.

In Figure 1 I have shown a device in which the lamps and housing are rotatable with respect to the photocell. A modification of the invention where the photocell is mounted for rotation is shown in Figure 9, which is a fragmentary view of the bottom portion of Figure 1 modified to this end. Here instead of being mounted on member 31, photocell 15 is mounted on a worm wheel 80' pivoted at 81' to member 12 and provided with teeth 82' for driving by a worm in the same fashion as that described in connection with housing 17. The worm wheel insulatingly carries slip rings for making electrical connection between the tube electrodes and conductors 26', 27' and 28' leading to the amplifier. It is apparent that as housing 17 remains stationary and photocell 15 rotates, the same electrical effect is produced as before.

Thus far in my specification I have referred primarily to the use of this device in cooperation with a member 16 which is responsive to the earth's magnetic field, a use to which it is peculiarly adapted. However, it will be realized that any method for rotating member 16 may be used, and that the response of the device will be the same regardless of whether the deviation is due to magnetic effects or due to some mechanical rotation of member 16. Thus, for example, the member 16 might be connected by a link to a table whose inclination it is desired to report. The member might also be connected as by a lever arm to a float for indicating liquid level, or to a valve stem for indicating the position of a butterfly valve. It will also be evident that various mechanical means for causing relative rotation of the lamp sources with respect to the housing may be substituted for the worm and gear and bevel gear assemblies I have disclosed.

It will further be apparent that rotation of the shaft of the synchroscope can be arranged to operate motor control mechanism to control the direction of flight of a craft or to actuate such other operations as the device may be supervising. It will still further be apparent that the worm and wheel adjustment may be arranged to rotate the phototube rather than the lamps, or that both the photocell and the lamps may be so rotatably mounted, if this is considered more expedient. Such modifications of the structure and new applications of the system of my invention will occur to those skilled in the art, and for this reason my invention should not be limited to the preferred embodiment I have disclosed, but only by the appended claims.

I claim as my invention:

1. Control apparatus comprising in combination, motor means to be controlled, a first member continuously rotatable about an axis, a plurality of light sources mounted upon said first rotatable member, a second member rotatable about the same axis and rotatably responsive to the earth's magnetic field, a light refracting member carried by said second rotatable member, means for continuously directing light from said sources through said light refracting means, a plurality of electrically light-responsive members opposedly mounted symmetrically with respect to said axis, light reflecting means means mounting said reflecting means to receive said light from said refracting means and reflect said light upon said light-responsive members, and means operatively associated with said light-responsive members and controlled thereby for actuating said motor means.

2. Control apparatus comprising in combination, motor means to be controlled, a first member continuously rotatable about an axis, a plurality of light sources carried by said first member, a second member continuously rotatable about said axis, said second member rotatably responding to the earth's magnetic field, a light refracting member unitarily mounted on said second member, lens means continuously directing light from said sources through said light refracting means, a pair of electrically light-responsive members symmetrically mounted about said axis, light reflecting means means mounting said reflecting means to receive said light from said refracting member and reflect said light upon said light-responsive members, and means operatively associated with said light-responsive members and controlled thereby for actuating said motor means.

3. Photoelectric means for continuously operating an indicator in accordance with movement of a control member continuously rotatable about an axis, comprising the control member, a plurality of light sources, light refracting means unitarily mounted on said control member for rotation therewith, said light sources being unitarily rotatable about said axis, internally reflecting means, lens means continuously directing light from said sources through said refracting means and on to said reflecting means, a pair of photoelectric cells mounted for rotation about said axis, said reflecting means continuously directing said light toward said photoelectric cells, rotation of said refracting means being adapted to alter the distribution of illumination of said photoelectric cells, an indicator, and means selectively actuating said indicator in response to said change in said distribution of illumination of said photoelectric cells.

4. Photoelectric means for continuously operating an indicator in accordance with movement of a control member continuously rotatable about an axis comprising the control member, a plurality of light sources, light reflecting means, unitarily mounted on said control member for rotation therewith, internally reflecting means, lens means continuously directing light from said sources through said refracting means and on to said reflecting means, a pair of photoelectric cells, said reflecting means continuously directing said light upon said photoelectric cells, rotation of said refracting means being adapted to alter the distribution of illumination of said photoelectric cells, an indicator, and means for selectively actuating said indicator in response to alteration in said distribution of illumination of said photoelectric cells.

5. Photoelectric means for continuously operating an indicator in accordance with movement of a control member continuously rotatable about an axis comprising the control member, a member mounted for mechanical rotation about said axis, a plurality of light sources mounted on said mechanically rotatable member, light refracting means unitarily mounted on said control member for rotation therewith, internally reflecting means, lens means continuously directing light from said sources through said refracting means and onto said reflecting means, a pair of photoelectric cells, said reflecting means continuously directing said light upon said photoelectric cells, rotation of said refracting means being adapted to alter the distribution of illumination of said photoelectric cells, an indicator, means for selectively actuating said indicator in response to alteration in said distribution of illumination of said photoelectric cells, a graduated ring carried by said mechanically rotatable member, an index adapted to cooperate with said ring whereby to indicate the angular position of said member, and independent means for varying the angular position of said member.

6. In a device of the class described, means generating an alternating voltage of variable phase, comprising a plurality of sources of light arranged in sequence about an axis, means cyclically modulating the intensities of said sources at a common frequency, successive peaks of modulation of said sources, considered in said sequence, taking place at equal intervals throughout each cycle of said frequency, a light deflecting member mounted for rotation about said axis, means continuously directing beams of light from said modulated sources upon said deflecting means, whereby to deflect said beams, electrically light responsive means having a plurality of light responsive members arranged about said axis in sequence, means continuously directing said deflected beams upon said responsive members, means for causing rotation of said deflecting means from a zero position, the total illumination of said responsive means by said deflected beams from said modulated sources being distributed to said responsive means in accordance with the rotated position of said deflecting means, and means continuously integrating the electrical responses of said responsive members, said integrated response varying cyclically at said common frequency, the peak value of said integrated response varying with rotation of said deflecting means from said zero position, rotation of said deflecting means moreover advancing and delaying the occurrence of said peak compared to its occurrence when said deflecting means is in said zero position.

7. In a device of the class described, means generating an alternating voltage of variable phase, comprising a plurality of sources of light arranged in sequence about an axis, means cyclically modulating the intensities of said sources at a common frequency, successive peaks of modulation of said sources, considered in said sequence, taking place at equal intervals throughout each cycle of said frequency, a light deflecting member mounted for rotation about said axis, means continuously directing beams of light from said modulated sources upon said deflecting means, whereby to deflect said beams, electrically light responsive means having a plurality of light responsive members arranged about said axis in sequence, means continuously directing said deflected beams upon said responsive members, means for causing rotation of said deflecting means from a zero position, the total illumination of said responsive means by said deflected beams from said modulated sources being distributed to said responsive means in accordance with the rotated position of said deflecting means, and means continuously integrating the electrical responses of said responsive members, said integrated response varying cyclically at said common frequency, the peak value of said integrated response varying with rotation of said deflecting means from said zero position, rotation of said deflecting means moreover advancing and delaying the occurrence of said peak compared to its occurrence when said deflecting means is in said zero position, said pluralities comprising an odd number and an even number of units.

8. An optical system comprising a rotatable light housing a plurality of optically independent sources of light circumferentially and angularly spaced apart equal angles about the axis of the light housing and rotatably arranged about said axis, means severally directing beams from the several sources of said plurality toward a first common portion of said axis, light refracting means mounted for rotation about said axis at said first common portion, whereby to provide independent beams deflected away from said first common portion in the same axial direction with respect to said sources, means rotating said refracting means whereby to vary the angular disposition of said deflected beams about said axis with respect to the disposition of said sources, and means directing said deflected beams toward a second common portion of said axis for all rotated positions of said refracting means.

9. In a device of the class described, in combination, means providing an alternating electric signal of a desired frequency and of standard phase, means generating a second alternating electric signal of said desired frequency and of variable phase, means varying the phase of said second signal in response to change in a condition, and means interpreting said variation in phase in terms of change in said condition, said generating means comprising a plurality of sources of light arranged in an order about an axis, means cyclically modulating the intensities of said sources at a common frequency, successive peaks of modulation of said sources, considered in said order, taking place at equal intervals throughout each cycle of said frequency, a light deflecting member mounted for rotation about said axis, means continuously directing modulated beams of light from said sources upon said deflecting means, whereby to deflect said beams, electrically light responsive means having a plurality of light responsive members arranged about said axis in an order, means continuously directing said deflected beams upon said responsive members, and means continuously integrating the electrical responses of said responsive members, said phase varying means comprising means for causing rotation of said deflecting means from a zero position, the total illumination of said responsive means by said deflected beams from said modulated sources being distributed to said responsive means in accordance with the rotated position of said deflecting means, said integrated response varying cyclically at said common frequency, the peak value of said integrated response varying with rotation of said deflecting means from said zero position, rotation of said deflecting means moreover advancing and delaying the occurrence of said peak compared to its occurrence when said deflecting means is in said zero position.

10. In a device of the class described, a plurality of electrically light responsive members arranged about an axis, an unlike plurality of light sources axially spaced from said members and arranged about said axis, light deflecting means, means mounting said deflecting means to receive light from said sources and distribute said light to said members, means modulating the intensities of said sources at a desired frequency, the peak intensities of said sources occurring at equally spaced intervals in a cycle of said frequency, means integrating the responses of said members, said integrated responses varying cyclically at said desired frequency, and means altering the distribution of said light to said members whereby to vary the peak value of said integrated response and to advance and retard the occurrence of said peak compared to its occurrence when said distribution is normal.

11. A magnetic compass comprising in combination a plurality of electrically light responsive members arranged about an axis, an unlike plurality of light sources axially spaced from said members and arranged about said axis, light deflecting means distributing light from said sources to said members in a normal fashion, means modulating the intensities of said sources at a desired frequency, the peak intensities of said sources occurring at equally spaced intervals in a cycle of said frequency, means integrating the responses of said members, said integrated responses varying cyclically at said desired frequency, and means altering the distribution of said light to said members in response to changes in a component of the earth's magnetic field whereby to vary the peak value of said integrated response and to advance and retard the occurrence of said peak compared to its occurrence with said distribution.

12. A magnetically actuated device comprising in combination, an optical system including a plurality of sources of light circumferentially arranged about an axis, means directing beams from said source toward a first common portion of said axis, light refracting means mounted for rotation about said axis at said first common portion, whereby to provide beams deflected from said first common portion in the same axial direction with respect to said sources, means rotating said refracting means in response to change in the direction of a magnetic field, whereby to vary the angular disposition of said deflected beams about said axis with respect to the disposition of said sources, means directing said deflected beams toward a second common portion of said axis, an unlike plurality of light responsive members arranged about said axis at said second common portion, and means continuously integrating the electrical responses of said responsive members.

13. Means varying the phase of a cyclically varying electrical signal in response to change in a condition comprising an alternating electric signal of desired frequency and of standard phase, means generating a second alternating electric signal of said desired frequency and of variable phase, and means varying the phase of said second signal in response to change in a condition, said generator comprising a plurality of sources of light arranged in sequence about an axis, means cyclically modulating the intensities of said sources at a common frequency, successive peaks of modulation of said sources, considered in said sequence, taking place at equal intervals throughout each cycle of said frequency, a light deflecting member mounted for rotation about said axis, means continuously directing beams of light from said modulated sources upon said deflecting means, whereby to deflect said beams, electrically light responsive means having a plurality of light responsive members arranged about said axis in sequence, means continuously directing said deflected beams upon said responsive members, and means continuously integrating the electrical responses of said responsive members, said phase varying means comprising means for causing rotation of said deflecting means from a zero position, the total illumination of said responsive means by said deflected beams from said modulated sources being distributed to said responsive means in accordance with the rotated position of said deflecting means, said integrated response varying cyclically at said common frequency, the peak value of said integrated response varying with rotation of said deflecting means from said zero position, rotation of said deflecting means moreover advancing and delaying the occurrence of said peak compared to its occurrence when said deflecting means is in said zero position.

14. A device of the class described comprising, in combination, a photoelectric cell including a flat cathode having a pair of oppositely directed substantially parallel plane photoemissive surfaces, at least one source of light, means mounting said cell and said source so that light from said source may illuminate said cell, and means pivotally supporting one of said mounting means for rotation about an axis substantially parallel to said surfaces, so as to vary the relative illumination of said surfaces.

15. An optical system comprising a rotatable light housing, a plurality of optically independent sources of light of modulated intensity circumferentially and angularly spaced apart equal angles about the axis of the light housing and rotatably arranged about said axis, means severally directing beams from the several sources of said plurality towards a first common portion of said axis, light refracting means mounted for rotation about said axis at said first common portion, whereby to provide independent beams deflected away from said first common portion in the same axial direction with respect to said sources, means rotating said refracting means whereby to vary the angular disposition of said deflected beams about said axis with respect to the disposition of said sources, means directing said deflected beams toward a second common portion of said axis for all rotative positions of said reflected means, and means located on said axis at said second common portion and responsive to illumination intensity.

16. A remotely indicating compass comprising, in combination: an odd number of light sources sequentially arranged circumferentially about an axis; means cyclically varying the instantaneous intensities of said sources, from equal mean values, at a common frequency so that the portions of said cycle between instants of equal maximum energization of said sources in sequence are respectively the same as the portions of said circumference between the locations of said sources; a prismatic light refracting member axially spaced from said sources, means mounting said member for rotation about said axis, and means causing said rotation; lens means projecting light beams from said sources through said light refracting member in any rotated position thereof; an even number of photoemissive surfaces oppositely located in bilateral symmetry with respect to said axis and further axially spaced from said source; a mirror, and means mounting said mirror in the path of light from said sources projected through said light refracting member; means mounting said surfaces for illumination by the light reflected from said mirror; rotation of said member being effective to change the relative proportions of said surfaces illuminated by the beam from each said source; all whereby the algebraic sum of the effective intensities of illumination on those of said surfaces on opposite sides of any plane of bilateral symmetry of said surfaces is caused to vary cyclically, at the frequency of variation on the intensities of said sources, and whereby opposite rotations of said member are effective to advance and retard said cycle; each of the said photoemissive surfaces being associated with an anode and constituting a photoelectric cell, said cells yielding photoemissive currents in proportion to the intensities of their illumination; impedance means for converting said currents into voltage drops; means deriving an effective voltage which is the algebraic sum of said voltage drops, corresponding to said algebraic sum of said intensities, and which varies in phase with rotation of said member; a standard voltage of said frequency and of fixed phase; and means indicating the phase angle between said effective voltage and said standard voltage.

WALDO H. KLIEVER.

REFERENCES CITED

The following references are of record in the file of this patent:

UNITED STATES PATENTS

| Number | Name | Date |
|---|---|---|
| 1,016,240 | Alexieff | Jan. 30, 1912 |
| 1,174,240 | Dussaud | Mar. 7, 1916 |
| 1,585,210 | Roux | May 18, 1926 |
| 1,885,098 | Hill | Oct. 25, 1932 |
| 1,917,854 | Rentschler | July 11, 1933 |
| 1,927,854 | Straubel | Sept. 26, 1933 |
| 1,976,648 | Wittkuhns | Oct. 9, 1934 |
| 1,985,072 | Bauersfeld | Dec. 18, 1934 |
| 2,019,234 | Nistri | Oct. 29, 1935 |
| 2,034,586 | Long | Mar. 17, 1936 |
| 2,054,417 | Gramsa | Sept. 15, 1936 |
| 2,080,511 | Sjostrand | May 18, 1937 |
| 2,085,050 | Stout | June 29, 1937 |
| 2,172,064 | Harrison | Sept. 5, 1939 |
| 2,256,487 | Moseley et al. | Sept. 23, 1941 |
| 2,271,296 | Hargrave et al. | Jan. 27, 1942 |
| 2,309,117 | John | Jan. 26, 1943 |
| 2,325,365 | Britten | July 27, 1943 |

FOREIGN PATENTS

| Number | Country | Date |
|---|---|---|
| 250,946 | Great Britain | Apr. 13, 1926 |

Certificate of Correction

Patent No. 2,447,344.

August 17, 1948.

WALDO H. KLIEVER

It is hereby certified that errors appear in the printed specification of the above numbered patent requiring correction as follows: Column 8, line 32, before the word "flowing" insert *current*; column 11, line 3, claim 4, for "reflecting" read *refracting*; and that the said Letters Patent should be read with these corrections therein that the same may conform to the record of the case in the Patent Office.

Signed and sealed this 16th day of November, A. D. 1948.

[SEAL]

THOMAS F. MURPHY,
*Assistant Commissioner of Patents.*